United States Patent [19]

Shiraishi

[11] Patent Number: 5,266,940
[45] Date of Patent: Nov. 30, 1993

[54] METHOD OF GRAY SCALE DISPLAY FOR DOT MATRIX TYPE DISPLAY DEVICE

[75] Inventor: Tai Shiraishi, Nara, Japan

[73] Assignee: Sharp Kabushiki Kaisha, Osaka, Japan

[21] Appl. No.: 825,330

[22] Filed: Jan. 27, 1992

Related U.S. Application Data

[63] Continuation of Ser. No. 318,822, Mar. 3, 1989, abandoned.

[30] Foreign Application Priority Data

Mar. 5, 1988 [JP] Japan ................... 63-52242

[51] Int. Cl.$^5$ .............................................. G09G 1/14
[52] U.S. Cl. ................................. 345/148; 345/149
[58] Field of Search ............... 340/703, 784, 793, 767, 340/783, 774, 775, 771; 358/240

[56] References Cited

U.S. PATENT DOCUMENTS

| | | | |
|---|---|---|---|
| 3,845,243 | 10/1974 | Schmersal et al. | 340/771 |
| 3,886,403 | 5/1975 | Owaki et al. | 340/767 |
| 4,142,181 | 2/1979 | Moricca et al. | 358/240 |
| 4,149,111 | 4/1979 | Coates, Jr. | 340/767 |
| 4,531,160 | 7/1985 | Ehn | 340/793 |
| 4,800,375 | 1/1989 | Silverstein et al. | 358/240 |
| 4,808,991 | 2/1989 | Tachiuchi et al. | 340/793 |
| 4,827,255 | 5/1989 | Ishii | 340/703 |

FOREIGN PATENT DOCUMENTS 61-205983 9/1986 Japan .

Primary Examiner—Alvin E. Oberley
Assistant Examiner—Steve Saras

[57] ABSTRACT

A method for displaying a gray scale on a dot matrix type display device divides picture elements on a screen of the display device into partitions with N picture elements per partition. The picture elements correspond to (N+1) degrees of the gray scale display in which a binary level display signal is generated for representing a lighting and a lighting status. The method also upon setting each picture element to a desired degree of the gray scale display, provides that adjacent picture elements, at least in the same partition, have different phases with respect to the gray scale display. The picture elements arrayed at the same position in each partition have the same phase with respect to the gray scale display when their degree is the same.

3 Claims, 25 Drawing Sheets

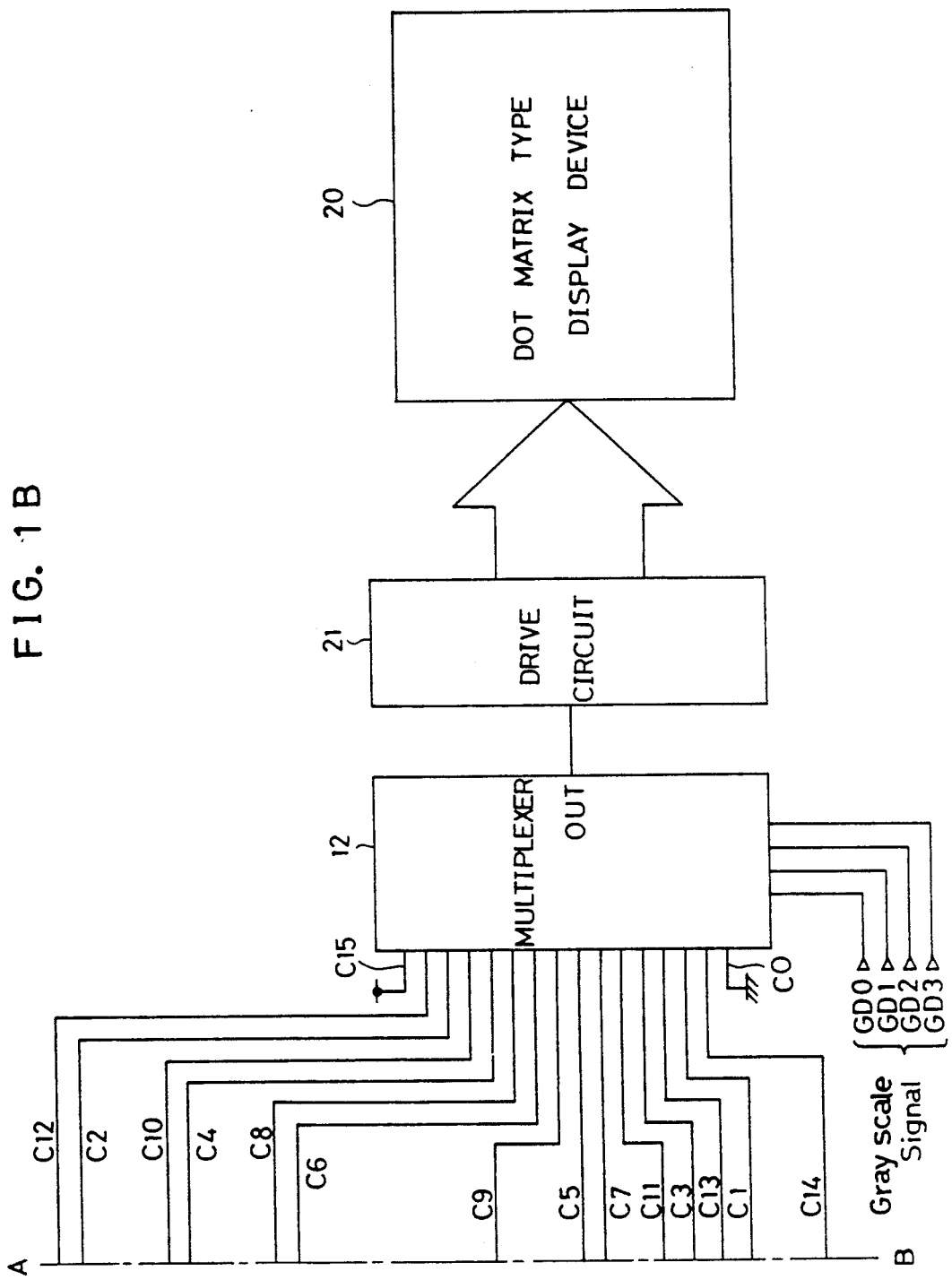

| P00 | P01 | P02 | P03 |
| --- | --- | --- | --- |
| P10 | P11 | P12 | P13 |
| P20 | P21 | P22 | P23 |
| P30 | P31 | P32 | P33 |

| 1 | 0 | 1 | 0 |
|---|---|---|---|
| 0 | 0 | 0 | 0 |
| 0 | 0 | 1 | 0 |
| 0 | 0 | 0 | 0 |

(2)

| 0 | 0 | 0 | 0 |
|---|---|---|---|
| 0 | 1 | 0 | 0 |
| 1 | 0 | 0 | 0 |
| 0 | 0 | 0 | 1 |

(3)

| 0 | 1 | 0 | 0 |
|---|---|---|---|
| 0 | 0 | 0 | 1 |
| 0 | 0 | 0 | 0 |
| 0 | 1 | 0 | 0 |

(4)

| 0 | 0 | 0 | 1 |
|---|---|---|---|
| 0 | 0 | 0 | 0 |
| 0 | 1 | 0 | 1 |
| 0 | 0 | 0 | 0 |

METHOD OF GRAY SCALE DISPLAY FOR DOT MATRIX TYPE DISPLAY DEVICE

This application is a continuation of application Ser. No. 07/318,822 filed on Mar. 3, 1989, now abandoned.

BACKGROUND OF THE PRESENT INVENTION

1. Field of the Present Invention

The present invention relates to a method of gray scale display which can be advantageously employed in a dot matrix type display device for use as a display in, for example, personal computers and word processors.

2. Description of the Prior Art

Generally, in dot matrix type display units having no gray scale display function, i.e., binary level display function, such as liquid crystal, electroluminescence, and plasma display devices, gray scale display is simulated by two known methods, i.e., area gray scale method, for example, dizza method and frame thinning method. The area gray scale method has a disadvantage because it reduces display resolution. The frame thinning method involves a difficulty becomes a multi-gray scale is displayed, the trouble of so-called "flicker" occurs with respect to picture elements displayed in medium gray scale. Especially in the case of displaying a large area in same medium gray scale, the flicker is more remarkable, thus causing deterioration in display quality level.

A gray scale display system for reduction of such flicker is disclosed in Japanese Patent Laid-Open Publication No. SHO 61-205983. In this gray scale display system, as shown in FIG. 22 shows, all picture elements on the screen are classified into two kinds, i.e., picture element $\alpha$ and picture element $\beta$. Picture elements $\alpha$ and $\beta$ are generally switched in antiphase respectively.

A picture element $\alpha$ and a picture element $\beta$ are arrayed alternately in vertical and horizontal directions to form a zigzag grating configuration. Therefore, through antiphase display performance of the picture elements $\alpha$ and $\beta$, the trouble of flicker may be prevented.

In the above noted prior art arrangement, if an 8-gray scale display, for example, is made for each picture element, the lighting mode of picture elements $\alpha$ in individual gray scales is shown in FIG. 23. In FIG. 23, (1) through (8) correspond respectively to gray scales of duty 8/8, 7/8, 6/8, 5/8 4/8, 3/8, 2/8 and 0/8. In FIG. 23, the high level denotes the lighting status of the picture element and the low level denotes the non-lighting status of the picture element. The term "duty" referred to herein means a rate of the number of frames in which a picture element is lighted up in one period to the total number of frames constituting the period, where the lighting mode of the picture element in each gray scale comprises 8 frames as the period, for example.

The lighting mode of picture element $\beta$ is shown in FIG. 24, in which (1) through (8) correspond respectively to the eight gray scales as above noted. FIG. 25 is a composite representation showing the lighting mode of picture elements $\alpha$ and $\beta$ in their individually corresponding gray scales. That is, it shows a lighting mode visually recognized when the picture elements $\alpha$ and $\beta$ are seen at same time. In FIG. 25, (1) through (8) also individually correspond to the gray scales shown. As can be seen from FIG. 25, gray scale display is not satisfactory in smoothing effect with respect to gray scales of duty 2/8 and 6/8, as also in gray scales of duty 3/8, 5/8, and 7/8. For example, if the frequency of vertical synchronizing signal is 70 Hz, a luminance variation of 17.5 Hz will occur with the gray scales of duty 3/8, 5/8, and 7/8, and a luminance variation of 35 Hz with the gray scales of duty 2/8 and 6/8. Such high luminance variation may not be reduced even if the area for display in these gray scales is increased. Especially where an area having more than a certain expanse of the screen, is displayed in the gray scale of duty 3/8, therefore, a flicker of 17.5 Hz is particularly remarkable and adversely affects the quality level of display. With such a method, therefore, it has been difficult to achieve multi-gray scale display without causing a deterioration in the quality level of display in all gray scales involved in the multi-gray scale display.

SUMMARY OF THE INVENTION

Accordingly, it is an object of the present invention to provide a method of gray scale display which overcomes the above noted technical difficulty and which can achieve satisfactory gray scale display without involving degradation in the quality level of the display.

The present invention relates to a method of gray scale display for a dot matrix type display device comprising the steps of:

dividing picture elements on a screen of the display device into N numbers per partition which correspond to lighting and non-lighting; and setting each the picture element on a desired degree of gray scale display, provided that the picture elements adjacent each to others at least in the same partition shall be put on different phases on the gray scale display and the picture elements arrayed at the same position in each partitions shall be put on the same phases on the gray scale display, when its degree is the same.

BRIEF DESCRIPTION OF THE DRAWINGS

FIGS. 1A and 1B are block diagrams showing a gray scale display circuit 1 in one embodiment of the present invention;

FIG. 3 is a view showing by way of example one mode of display in partitions of 4 rows and 4 columns each;

DETAILED DESCRIPTION OF THE PREFERRED EMBODIMENTS

For the dot matrix type display device as employed in the present invention, generally it is possible to use such display device as is employed for display of binary level luminance. More particularly, display devices known in the art, such as liquid crystal, electroluminescence, and plasma display devices, can be used. Among various liquid crystal display devices, for example, those of the reflection type or the rear projection screen type which have 640×480 dot picture elements can be used.

Basically, such a display unit is operated for displaying by raster scanning, and general display operations that do not concern gray scale display may be performed by using any known method and control circuit.

According to the present invention, gray scale display is performed in such a way that picture elements are put in display status and non-display status according to the degree of gray scale display or gray scale involved during one display period. Each picture element utilizes a different phase in the gray scale display, whereby the trouble of flicker is prevented from occurring when all picture elements in at least one partition are having the display status in same gray scale.

One display period referred to above may be expressed by the sum of the time involved in display status and the time involved in non-display status with respect to picture elements required for a gray scale display. Display status and non-display status may be switched over from the one to the other on a frame by frame basis. The term "frame" means a period in which one complete picture is formed on the screen. In the present invention, therefore, gray scale can be recognized after, for example, a display of N frames has been made.

In the present invention, the term "display status of picture element" means that a picture element to be displayed is put in a different mode than the mode for a picture element serving as a background. In other words, when picture elements which serve as a background have a non-lighting status, a picture element to be displayed has a lighting status, or vice versa.

One embodiment of the present invention will now be described in detail with reference to the relevant ones of the accompanying drawings.

Figures 2A, 2B:
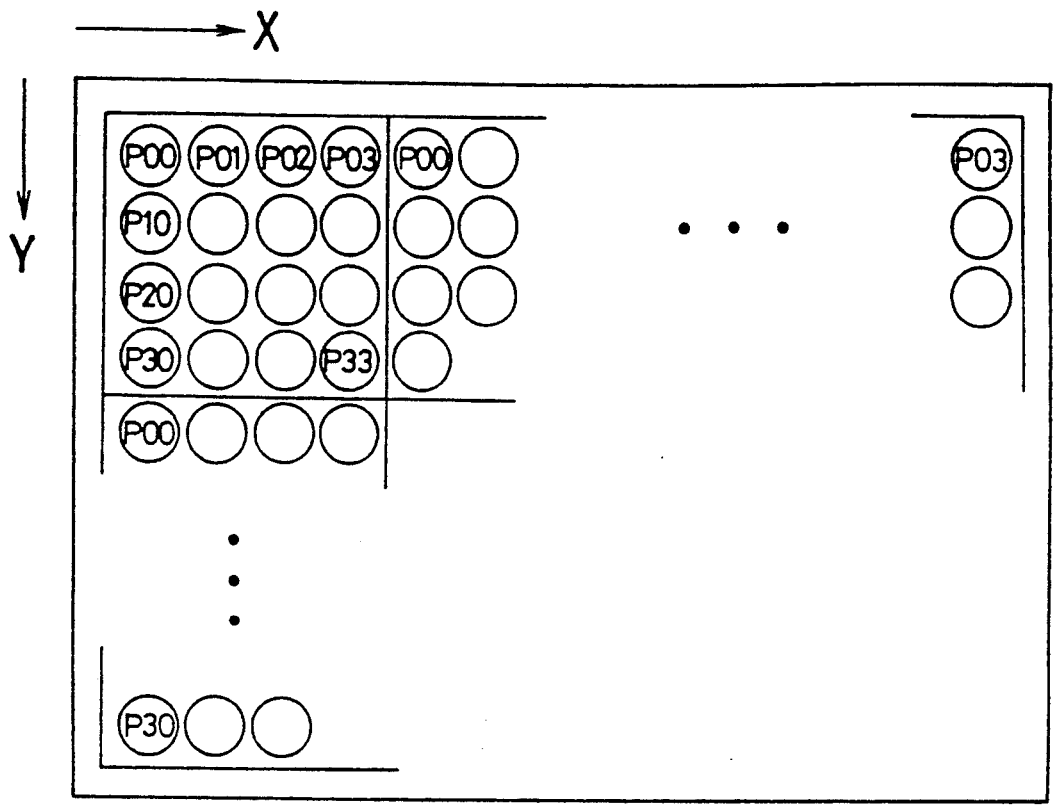
FIGS. 2A and 2B are explanatory views showing a screen on which display is made through the gray scale display circuit 1.

In this embodiment, a 16-gray scale display is utilized, and therefore, as FIG. 2A shows, picture elements arrayed in a matrix pattern on a screen of a dot matrix type display device 20 are partitioned in such a way that 4 picture elements positioned in direction X and 4 picture elements positioned in direction Y, that is a total of 16 picture elements are taken as one group. In other words, a plurality of partitions of picture elements, each partition consisting of 4 rows and 4 columns of picture elements, are set on the screen. An exemplary arrangement of picture elements in one partition is shown in FIG. 2B. As FIG. 2B shows, each picture elements arrayed at the same position in individual partitions are classified as picture element groups P00-P33.

Figure 1A:
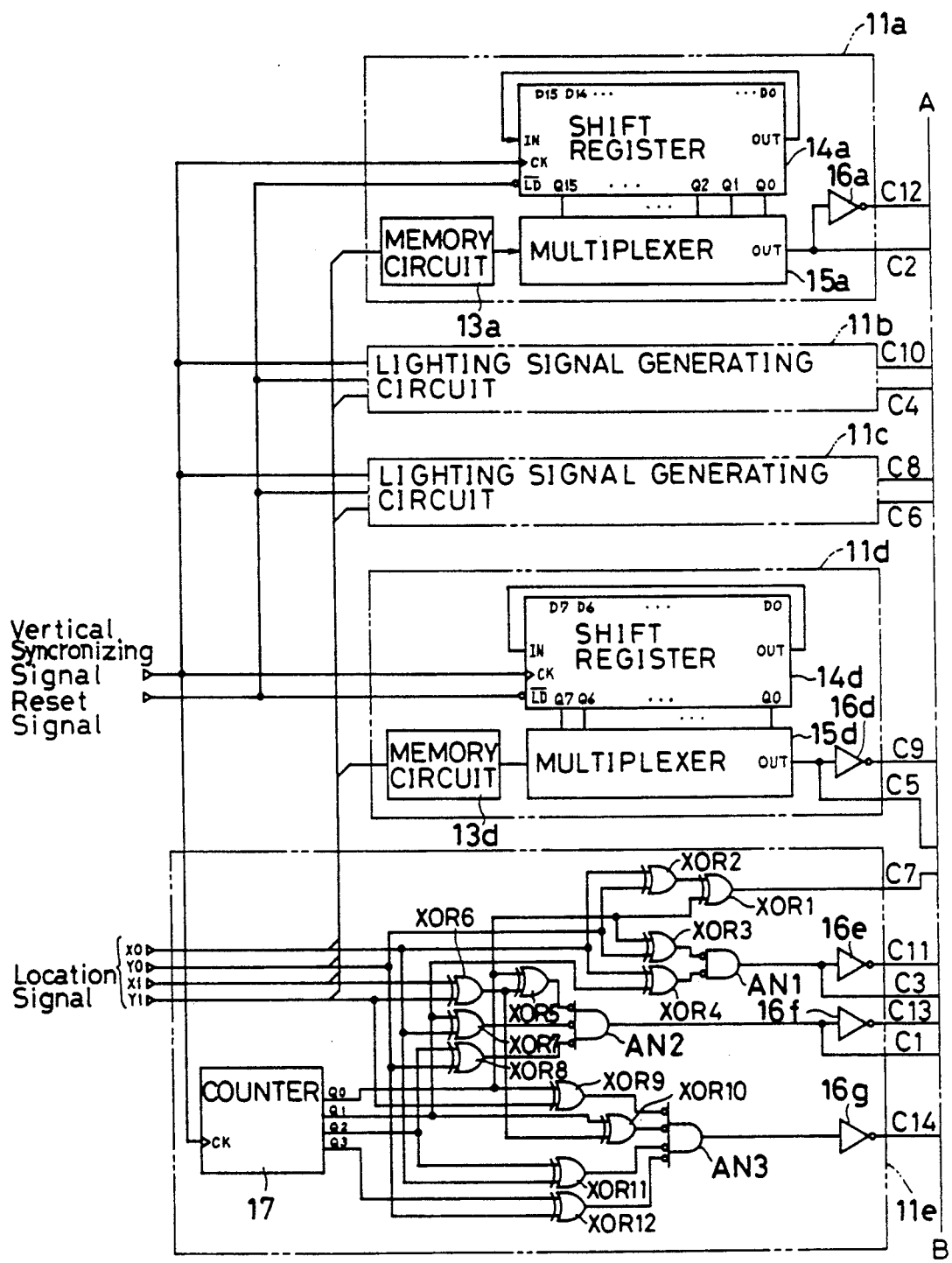

FIGS. 1A and 1B are block diagrams showing a gray scale display circuit 1 for determining lighting/non-lighting status for picture elements partitioned as above mentioned. The gray scale display circuit 1 comprises lighting signal generating circuits 11a-11e which generate signals for deciding on lighting/non-lighting for individual picture elements with respect to various gray scales, as will be described below, and a multiplexer 12.

Location signals X0, X1, Y0, and Y1 which designate particular picture element groups P00-P33 to which individual picture elements belong are received by the lighting signal generating circuits 11a-11e through, for example, a display control circuit including a microcomputer, not shown. Lighting signals C0-C15 individually corresponding to 16 gray scales for individual picture element groups P00-P33 and generated by the lighting signal generating circuits 11a-11e are received by the multiplexer 12. The multiplexer 12, by receiving gray scale signals GD0-GD3 for individual picture elements, selects a desired signal from the lighting signals C0-C15 and outputs the desired signal to a drive circuit 21 which drives the dot matrix type display device 20.

The display control circuit and drive circuit 21 may be of known types. A vertical synchronizing signal, a reset signal, and gray scale signals, which are all to be described below, are outputted from the display control circuit.

The lighting signal generating circuit 11a comprises, for example, a memory circuit 13a having a 4×16 bit configuration, a 16-bit shift register, a multiplexer 15a, and an inverter 16a. The lighting signal generating circuits 11b and 11c are also as that of similar arrangement of the lighting signal generating circuit 11a. In the lighting signal generating circuits 11a to 11c, corresponding parts are designated by same reference numerals with subscripts a, b, c. The lighting signal generating circuit 11d comprises a memory circuit 13d having a 3×16 bit configuration, an 8-bit shift register 14d, a multiplexer 15, and an inverter 16d.

Location signals X0, X1, Y0, and Y1 are inputted into the lighting signal generating circuit 11a and are received by the given to the memory circuit 13a, which uses the location signals X0, X1, Y0, and Y1 for addresses to output to the multiplexer 15a values from a 4-bit memory area designated by the addresses. The multiplexer 15a selects a signal to be outputted to output terminals Q0-Q15 of the shift register 14a and outputs it. The output signal of the multiplexer 15a is outputted to the multiplexer 12 as the lighting signal C2 to determine the timing for lighting picture elements on gray scale K2. The relationship between degrees of a gray scale display or gray scales and duties is shown in Table 1 below.

TABLE 1

| Gray scale | K0 | K1 | K2 | K3 | K4 | K5 | K6 | K7 | K8 | K9 | K10 | K11 | K12 | K13 | K14 | K15 |
|---|---|---|---|---|---|---|---|---|---|---|---|---|---|---|---|---|
| Duty | $\frac{0}{16}$ | $\frac{2}{16}$ | $\frac{3}{16}$ | $\frac{4}{16}$ | $\frac{5}{16}$ | $\frac{6}{16}$ | $\frac{7}{16}$ | $\frac{8}{16}$ | $\frac{9}{16}$ | $\frac{10}{16}$ | $\frac{11}{16}$ | $\frac{12}{16}$ | $\frac{13}{16}$ | $\frac{14}{16}$ | $\frac{15}{16}$ | $\frac{16}{16}$ |

The lighting signal C2 from the multiplexer 15a is inverted by the inverter 16a, and the inverted signal is outputted to the multiplexer 12 as a lighting signal C12 for gray scale K12. An initial value inputted to the shift register 14a is, upon entry of a reset signal, received by terminals D0-D15 through a memory not shown. The inputted initial value is then shifted in synchronism with a vertical synchronizing signal and outputted through outputs Q0-Q15. The shift register 14a has its output terminal OUT and input terminal IN connected together to form a ring counter. Initial values inputted to the terminals D0-D15 of the shift register 14a are shown in Table 2. The memory circuit 13a outputs signals designated by location signals X0, X1, Y0, and Y1 representing picture element groups P00-P33. Values of these signals are shown in Table 3. Character "h" denotes that the numbers in the Table 3 are hexadecimal numbers. These signal values represent how phases of individual picture element groups P01-P33 are out of phase with the signal for picture element group P00 taken as the basis.

TABLE 2

|     | D15 | D14 | D13 | D12 | D11 | D10 | D9 | D8 | D7 | D6 | D5 | D4 | D3 | D2 | D1 | D0 |
|-----|-----|-----|-----|-----|-----|-----|----|----|----|----|----|----|----|----|----|----|
| 14a | 0   | 0   | 0   | 0   | 0   | 1   | 0  | 0  | 0  | 0  | 1  | 0  | 0  | 0  | 0  | 1  |
| 14b | 0   | 0   | 0   | 1   | 0   | 0   | 1  | 0  | 0  | 1  | 0  | 0  | 1  | 0  | 0  | 1  |
| 14c | 0   | 0   | 1   | 0   | 1   | 0   | 1  | 0  | 0  | 1  | 0  | 1  | 0  | 1  | 0  | 1  |
| 14d | —   | —   | —   | —   | —   | —   | —  | —  | 1  | 0  | 1  | 0  | 0  | 1  | 0  | 0  |

TABLE 3

| Picture Element Group | Gray scale | | | | | | | |
|---|---|---|---|---|---|---|---|---|
| | K1, K13 | K2, K12 | K3, K11 | K4, K10 | K5, K9 | K6, K8 | K7 | K14 |
| P00 | 00h | 00h | 00h | 00h | 00h | 00h | 00h | 00h |
| P01 | 04h | 08h | 01h | 08h | 06h | 0Bh | 01h | 08h |
| P02 | 01h | 0Ah | 00h | 06h | 03h | 07h | 00h | 02h |
| P03 | 05h | 02h | 01h | 0Eh | 05h | 04h | 01h | 0Ah |
| P10 | 06h | 0Ch | 03h | 04h | 04h | 02h | 00h | 0Ch |
| P11 | 02h | 04h | 02h | 0Ch | 02h | 0Eh | 01h | 04h |
| P12 | 07h | 06h | 03h | 0Ah | 07h | 01h | 00h | 04h |
| P13 | 03h | 0Eh | 02h | 02h | 01h | 0Dh | 01h | 06h |
| P20 | 01h | 0Fh | 00h | 09h | 00h | 0Fh | 00h | 03h |
| P21 | 05h | 07h | 01h | 01h | 06h | 0Ch | 01h | 0Bh |
| P22 | 00h | 05h | 00h | 03h | 03h | 08h | 00h | 01h |
| P23 | 04h | 0Dh | 01h | 0Bh | 05h | 03h | 01h | 09h |
| P30 | 07h | 0Bh | 03h | 0Dh | 04h | 09h | 00h | 0Fh |
| P31 | 03h | 03h | 02h | 05h | 02h | 05h | 01h | 07h |
| P32 | 06h | 01h | 03h | 07h | 07h | 0Ah | 00h | 0Dh |
| P33 | 02h | 09h | 02h | 0Fh | 01h | 06h | 01h | 05h |

That is, by the values shown in Tables 1, 2 and 3, it is set that each picture element having a same display and being adjacent each to others at least in the same partition shall utilize different phases for the gray scale display. Picture elements arrayed at the same position in each partition shall utilize the same phases for the gray scale display when the degree of graph scale display is the same.

The lighting signal generating circuits 11b and 11c are of generally the same construction as the lighting signal generating circuit 11a as mentioned above, but as can be seen from Tables 2 and 3, the initial values inputted to the shift registers 14b and 14c are different from the contents stored in the memory circuits 13b and 13. In the lighting signal generating circuit 11b, therefore, a lighting signal C4 to determine timing for lighting picture elements with gray scale K4 is generated, and a lighting signal C10 for gray scale K10 is generated by inverting the lighting signal C4 with the inverter 16b. These signals C4 and C10 are outputted to the multiplexer 12. Likewise, in the lighting signal generating circuit 11c, a lighting signal C6 for gray scale K6 is generated and a lighting signal C8 for gray scale K8 is obtained by inverting the lighting signal C6 with the inverter 16c. These signals C6 and C8 are also outputted to the multiplexer 12. The shift registers 14a, 14b, and 14c are of the 16-bit type; therefore, lighting signals C2, C12, C4, C10, C6, and C8 from the lighting signal generating circuits 11a-11c are cycled on 16 inputs of the vertical synchronizing signal, that is, a 16-frame period.

The lighting signal generating circuit 11d outputs lighting signals C5 and C9 which are repeated on an 8-frame period basis. Therefore, the shift register 14d is of an 8-bit configuration and the memory circuit 13d is of a 3×16 bit configuration. The multiplexer 15d selectively outputs signals outputted to the terminals Q0-Q7 of the shift register 14d, by having reference to 3 bits of data from the memory circuit 13d. The initial values at the shift register 14d and contents stored in the memory circuit 13d are shown in the Tables 2 and 3.

The lighting signal generating circuit 11e comprises a counter 17, NOR circuits AN1-AN3, exclusive OR circuits XOR1-XOR12, and inverters 16e-16g, and outputs to the multiplexer 12 lighting signals C1, C3, C7, C11, C13, and C14 respectively for gray scales K1, K3, K7, K11, K13, and K14. The counter 17, which is of a 4-bit configuration, receives the vertical synchronizing signal in synchronizing to a count value being incremented. The value of the 0th bit in the counter 17, or output Q0 of the counter 17, is outputted to the exclusive OR circuits XOR1, XOR3, XOR5, and XOR9. The value of the 1st bit is outputted to the exclusive OR circuits XOR4, XOR7, XOR10. The value of 2nd bit is outputted to the exclusive OR circuits XOR8 and XOR11. The value of 3rd bit is outputted to the exclusive OR circuit XOR12.

Location signal X0 is received by the exclusive OR circuits XOR2, XOR4, XOR7 and XOR11, and location signal Y0 is received by the exclusive OR circuits XOR2, XOR3, XOR8, and XOR12. Location signal X1 is received by the exclusive OR circuit XOR6. Location signal Y1 is received by the exclusive OR circuits XOR6 and XOR9.

An output signal from the exclusive OR circuit XOR2 is received by the exclusive OR circuit XOR1, and an output signal from the exclusive OR circuit XOR1 is outputted as the lighting signal C7 to the multiplexer 12.

Output signals from the exclusive OR circuits XOR3 and XOR4 are, after being inverted, received the NOR circuit AN1. An output signal from the NOR circuit AN1 is outputted as the lighting signal C3 to the multiplexer 12, and after being inverted by the inverter 16e, it is received as the lighting signal C11 for the multiplexer 12.

An output signal of the exclusive OR circuit XOR6 is given to the exclusive OR circuit XOR5. Output signals of the exclusive OR circuits XOR5, XOR7, and XOR8 are inverted and then received by the NOR circuit AN2. An output signal of the NOR circuit AN2 is received, as the lighting signal C1, to the multiplexer 12 and, after being inverted by the inverter 16f, it is received by the multiplexer 12 as the lighting signal C13.

Output signals from the exclusive OR circuits XOR9, XOR10, XOR11, and XOR12 are inverted and then inputted to the NOR circuit AN3. An output signal from the NOR circuit AN3 is received, as lighting signal C14, by the multiplexer 12 through the inverter 16g.

The lighting signal C0 for gray scale K0 is received by the multiplexer 12 through a ground line, and the lighting signal C15 for gray scale K1 is received by the multiplexer 12 through a line having a certain voltage applied thereto.

Figure 4:
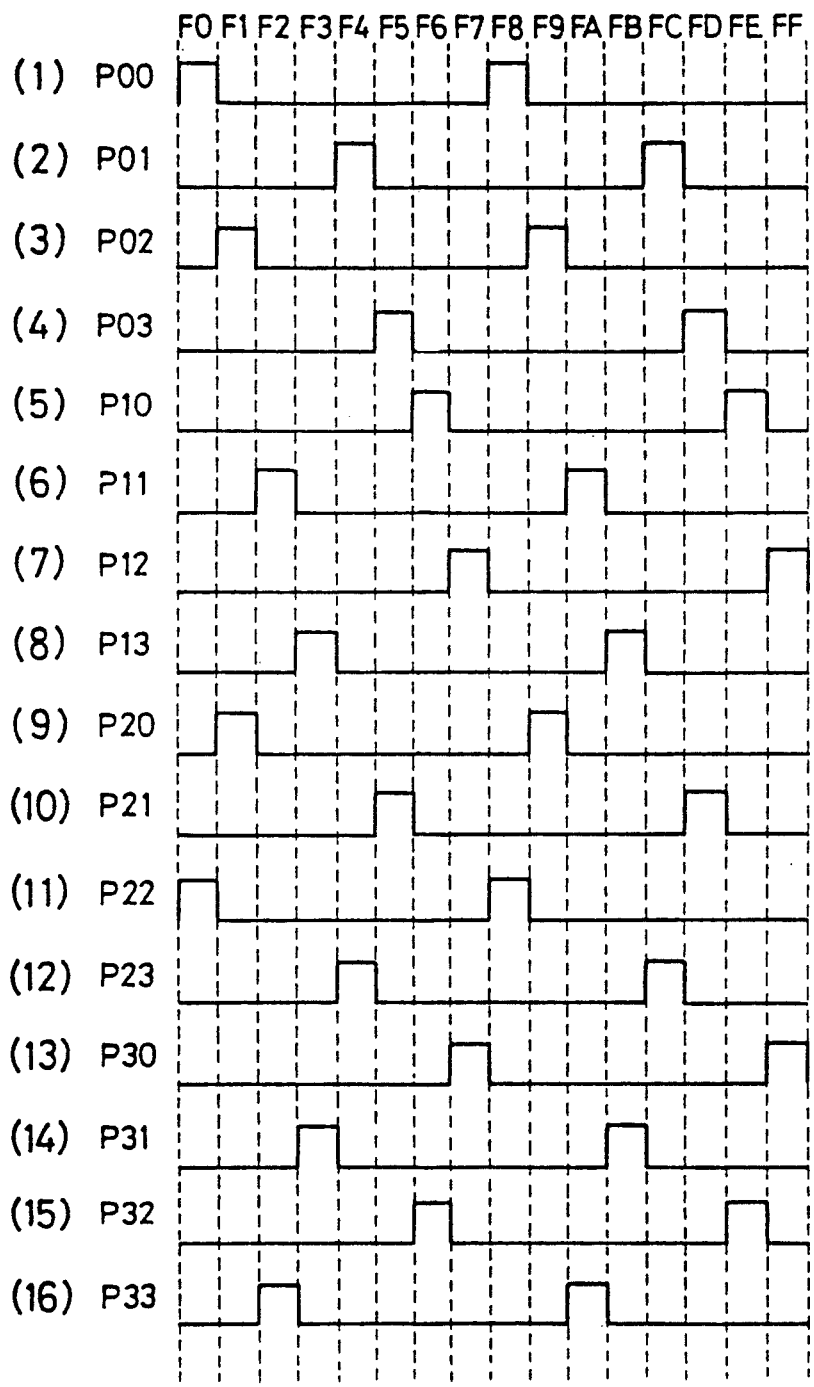
FIGS. 4 through 17, inclusive, are views showing lighting modes of picture element groups P00 to P33 in individual gray scales.

FIGS. 4 through 17 are views showing display modes of individual picture element groups P00-P33. Manner of operation will now be described with reference to these figures. In FIGS. 4 through 17, each high level represents lighting status and each low level represents non-lighting status. FIG. 4 shows a display mode for gray scale K1 or a duty 2/16 in 16 frames or one period for picture element groups P00-P33. In FIG. 4, (1) to (16) correspond individually to picture element groups P00-P33; the same relationship applies in FIGS. 5 to 17 as well. In this embodiment, therefore, 16 frames constitute one display period.

In the case of the duty 2/16 or gray scale K1, the multiplexer 12 outputs the lighting signal C1 to the drive circuit 21 according to the gray scale signals GD0-GD3 representing gray scale K1.

For example, the location signals X0, Y0, X1, and Y1 designating a picture element group P00 are all at low level, and in frame No. F0, signal from the counter 17 are all at low level. Therefore, output signals from the exclusive OR circuits XOR5, XOR7, and XOR8 are all at low level, whereas the lighting signal C1, an output signal from the NOR circuit AN2 is at high level. Accordingly, the picture element group P00 has a lighting status in frame No. F0. Subsequently, some of the 0th, 1st, and 2nd bits in the counter 17 goes to a high level according to the input the vertical synchronizing signal and thus some of the signals outputted from the exclusive OR circuits XOR5, XOR7, and XOR8 goes to a high level. An output signal from the NOR circuit AN2 goes to a low level. Accordingly, in frame Nos. F1 through F7, the picture element group P00 has a non-lighting status. In frame No. 8, the 0th to the 2nd bits are at low level; accordingly, as in the above mentioned case of frame No. F0, the picture element group P00 has a lighting status.

Display modes of subsequent picture element groups P01-P33 in frame Nos. F0-FF are out of phase relative to the display mode of the picture element group P00. Time lags in phase of the picture element groups P01-P33 for phase of the display mode of the picture element group P00 are as shown in Table 3.

Figure 5:
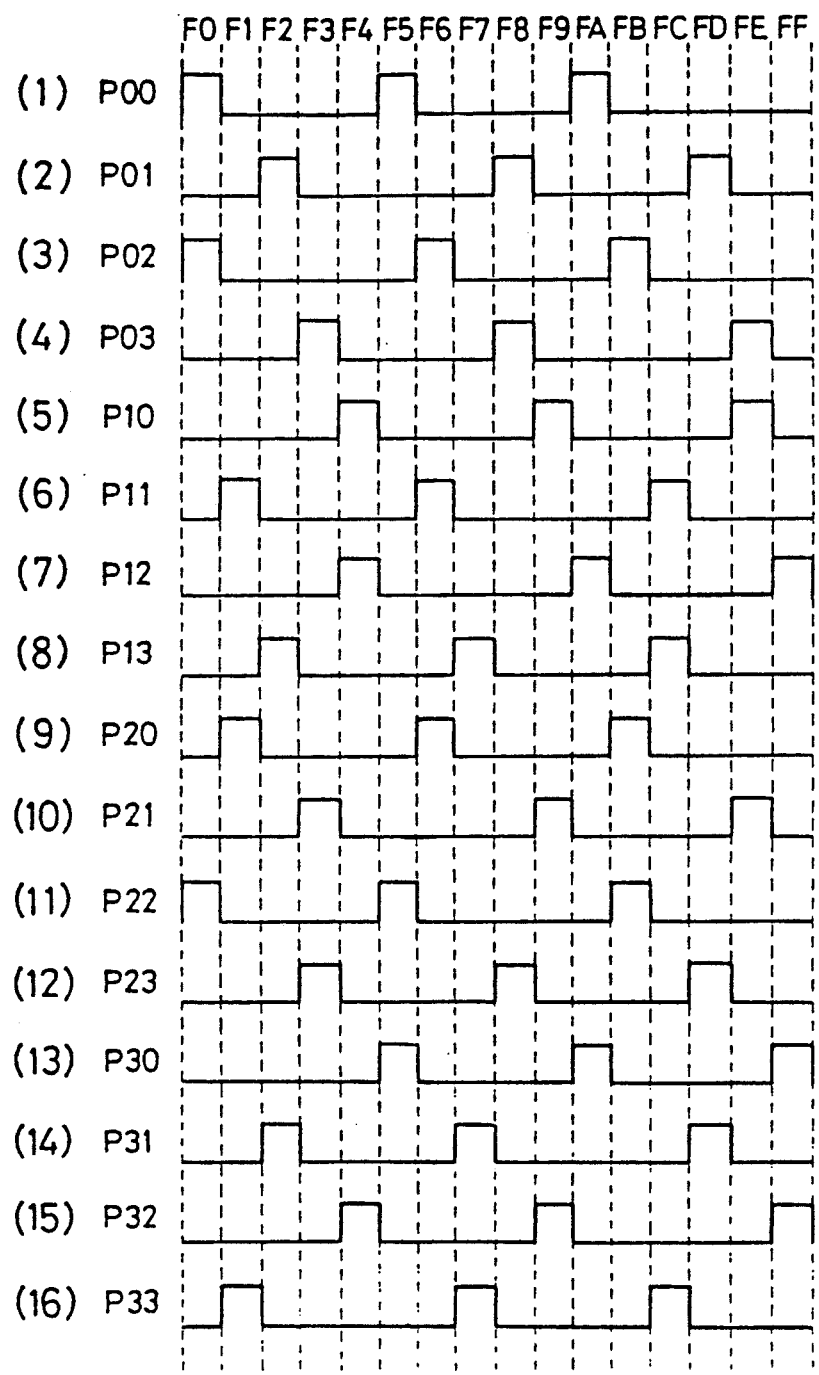
Figure 6:
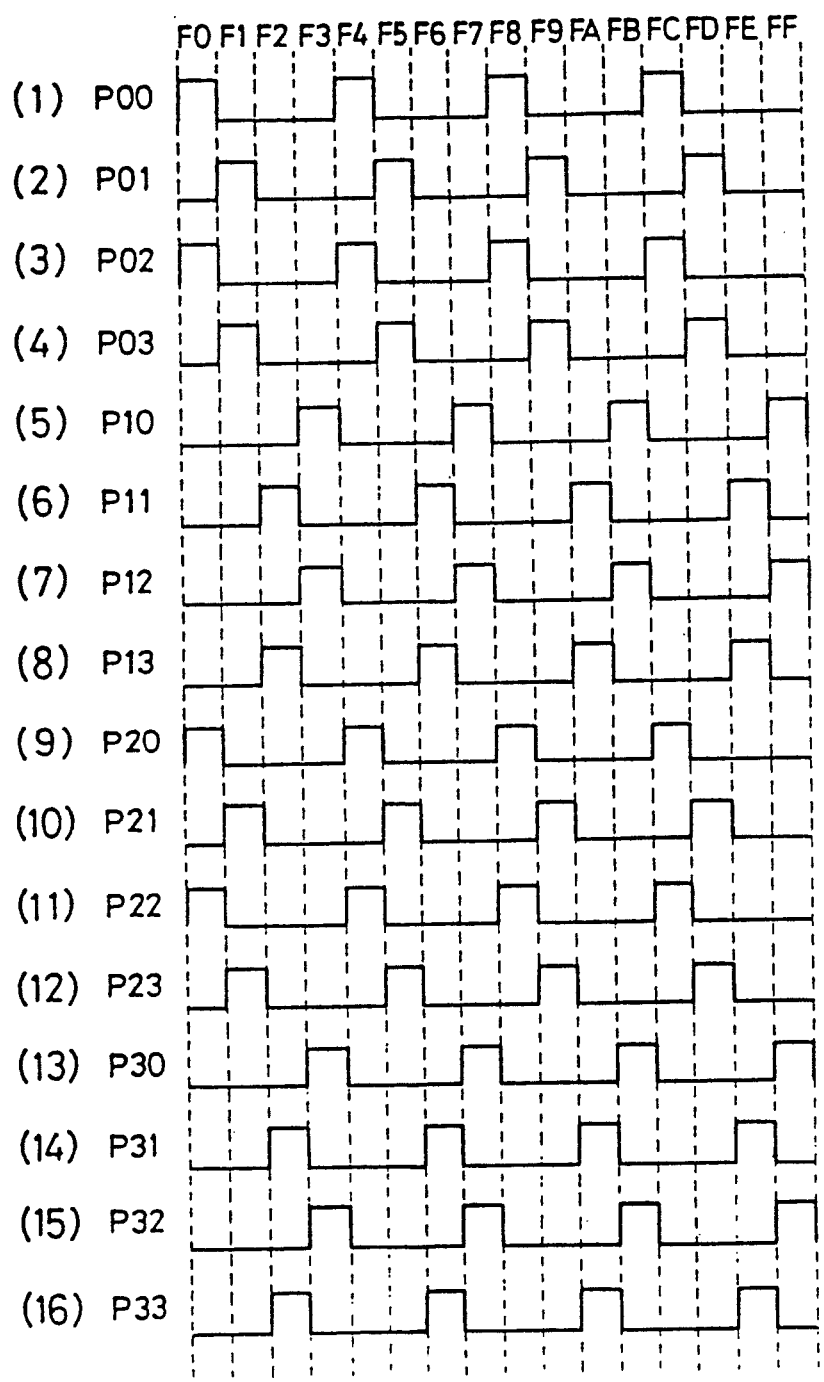
Figure 7:
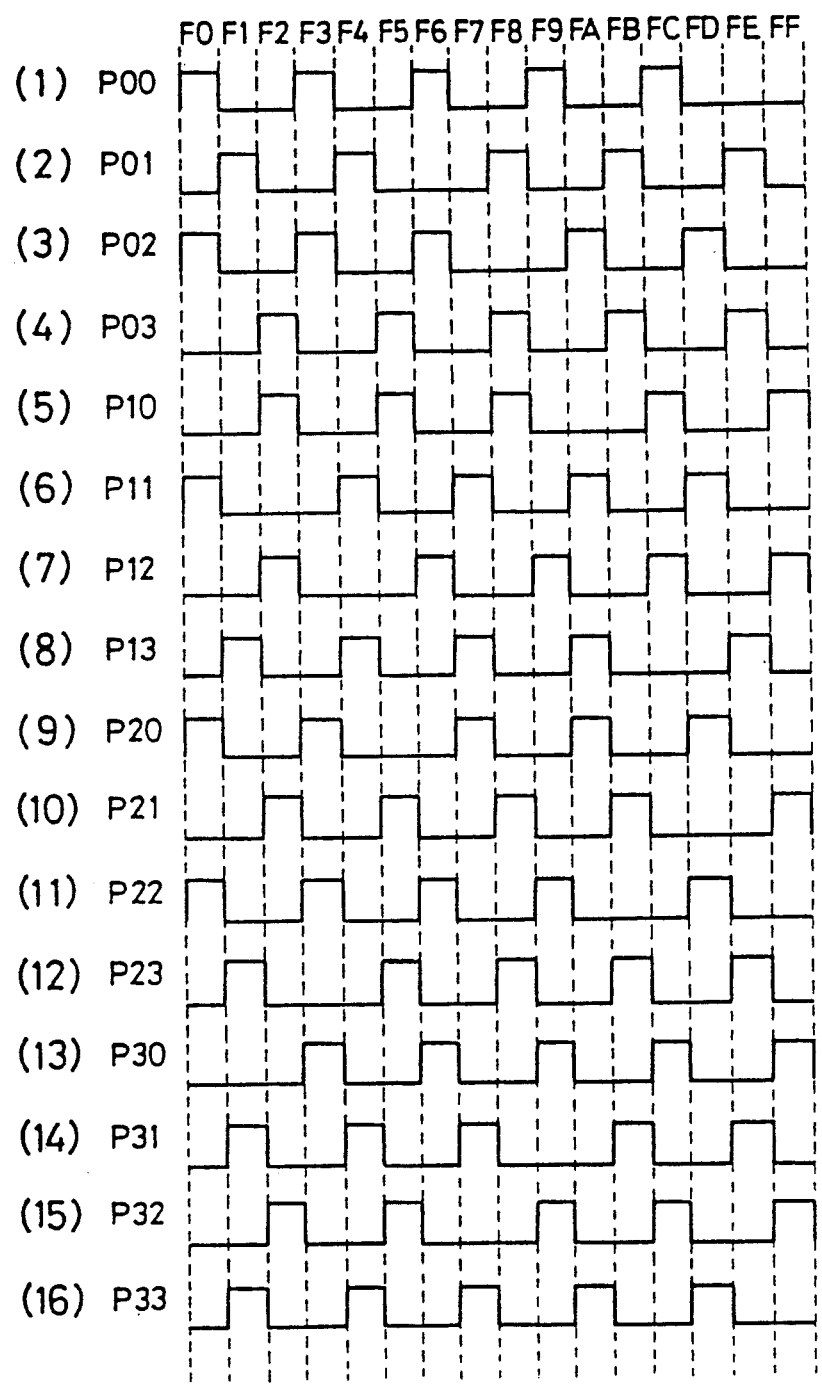
Figure 8:
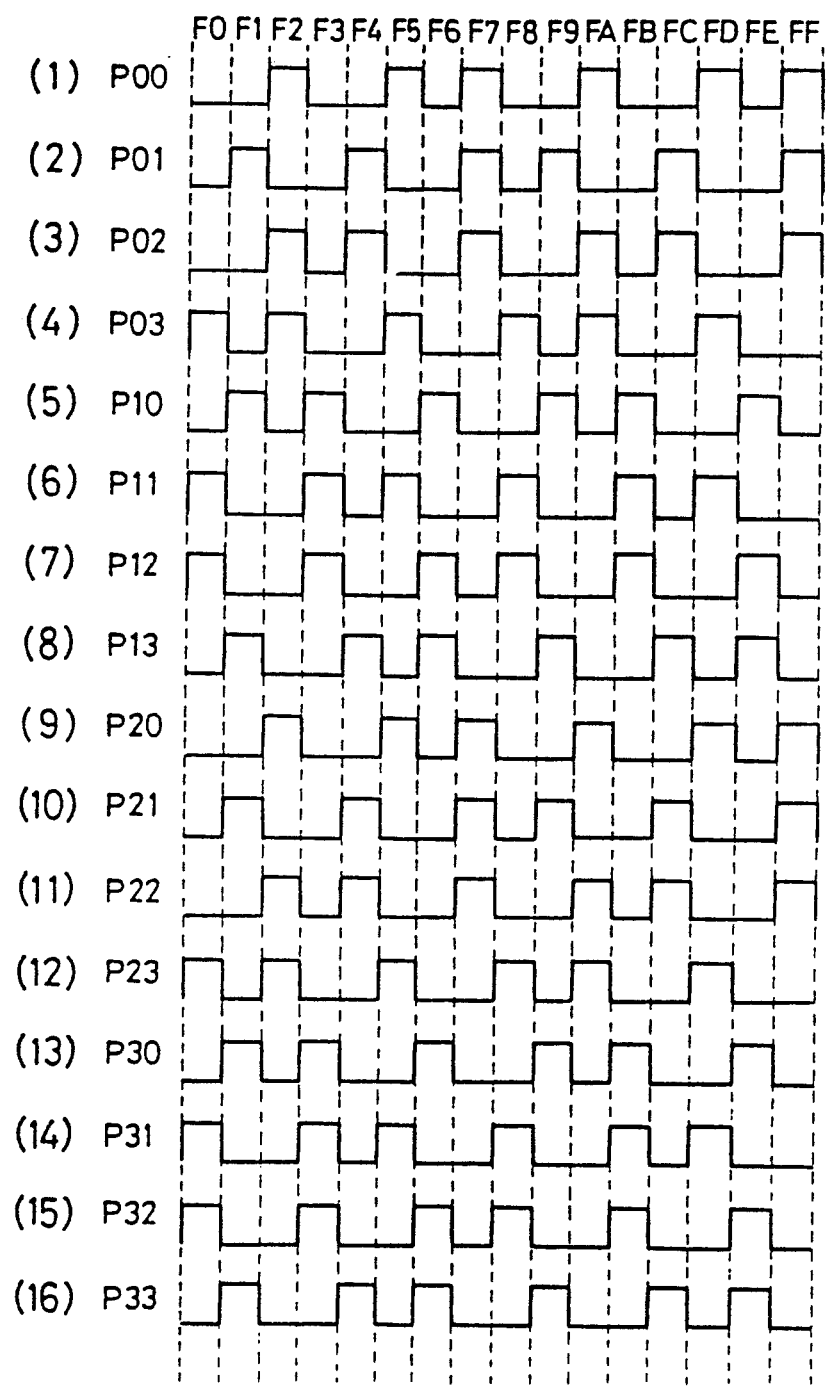
Figure 9:
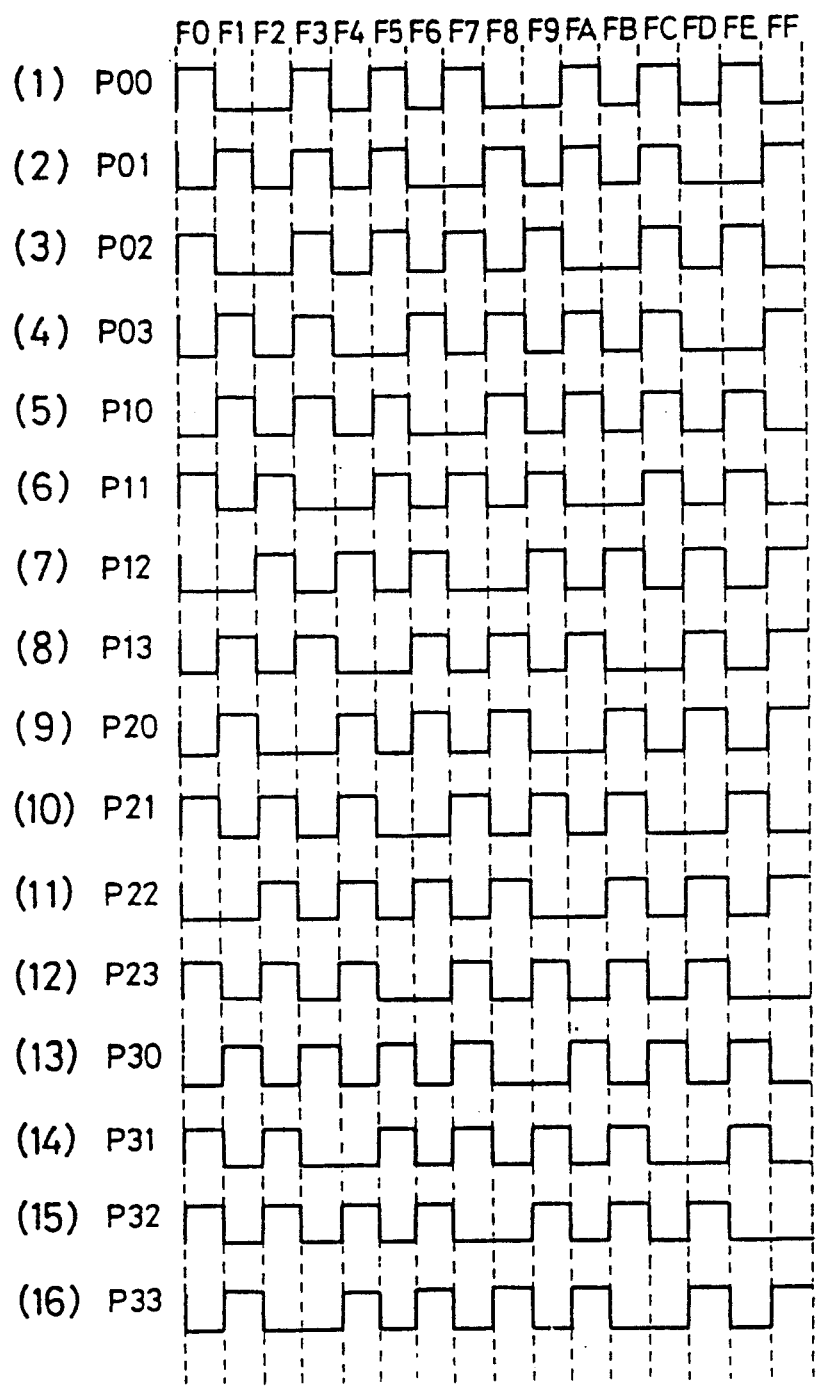
Figure 10:
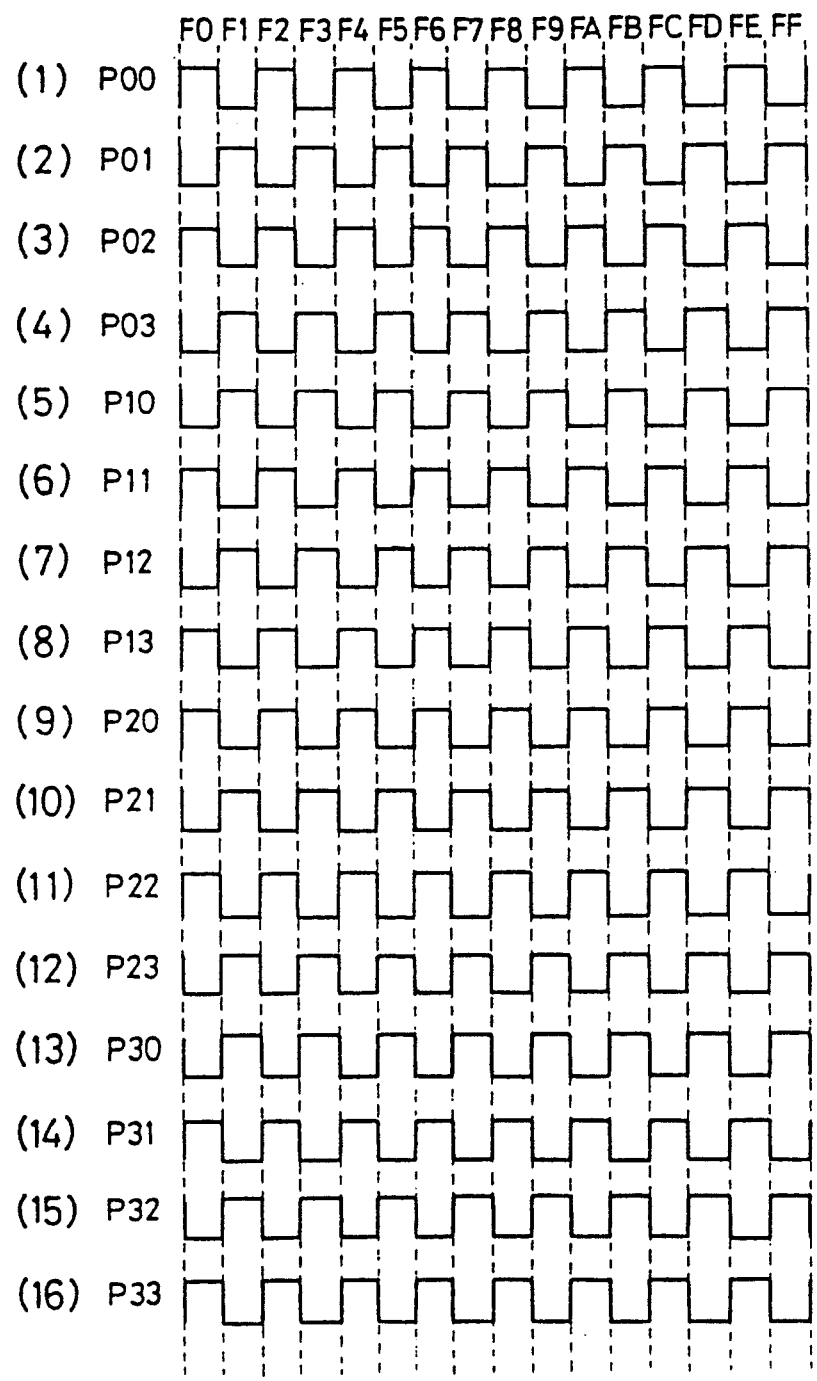
Figure 11:
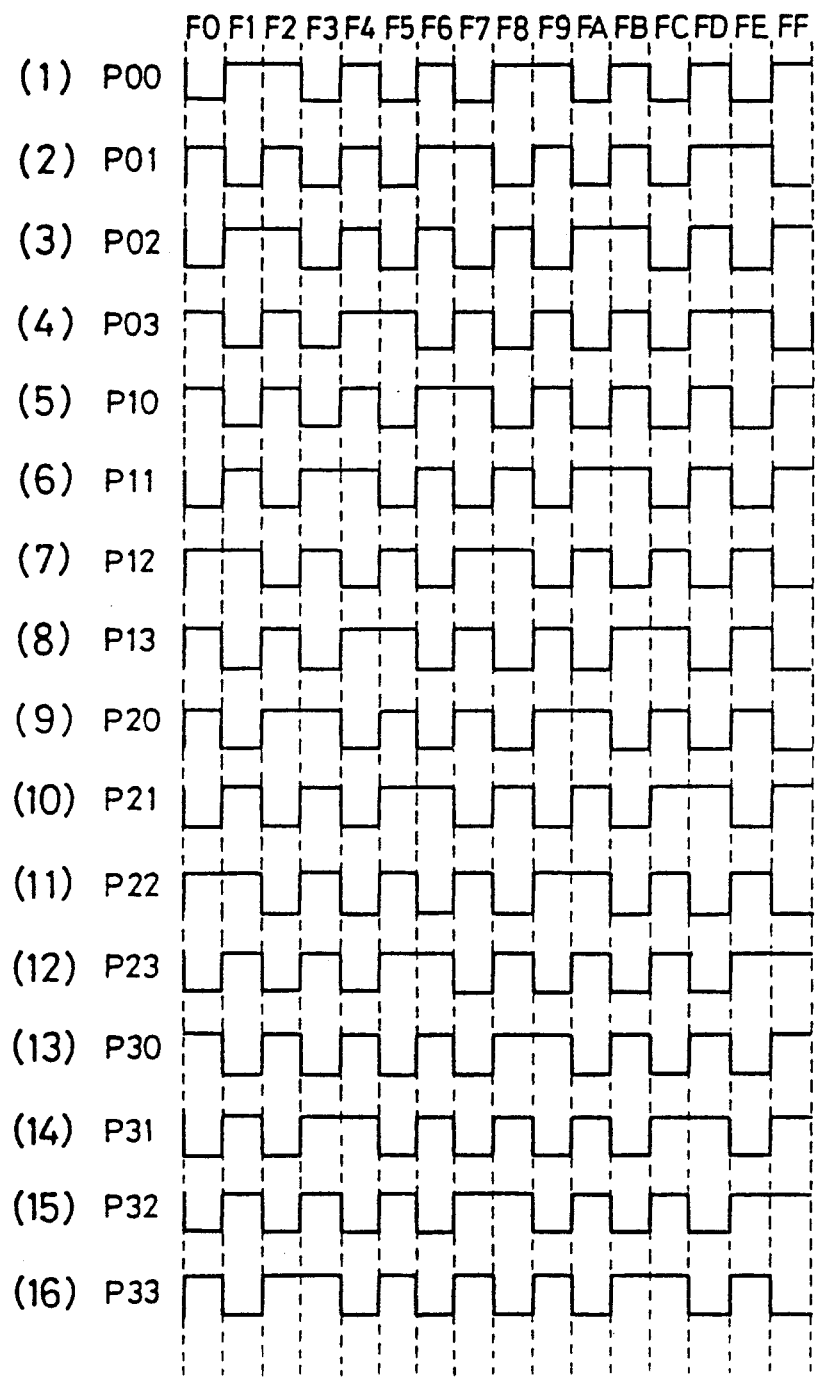
Figure 12:
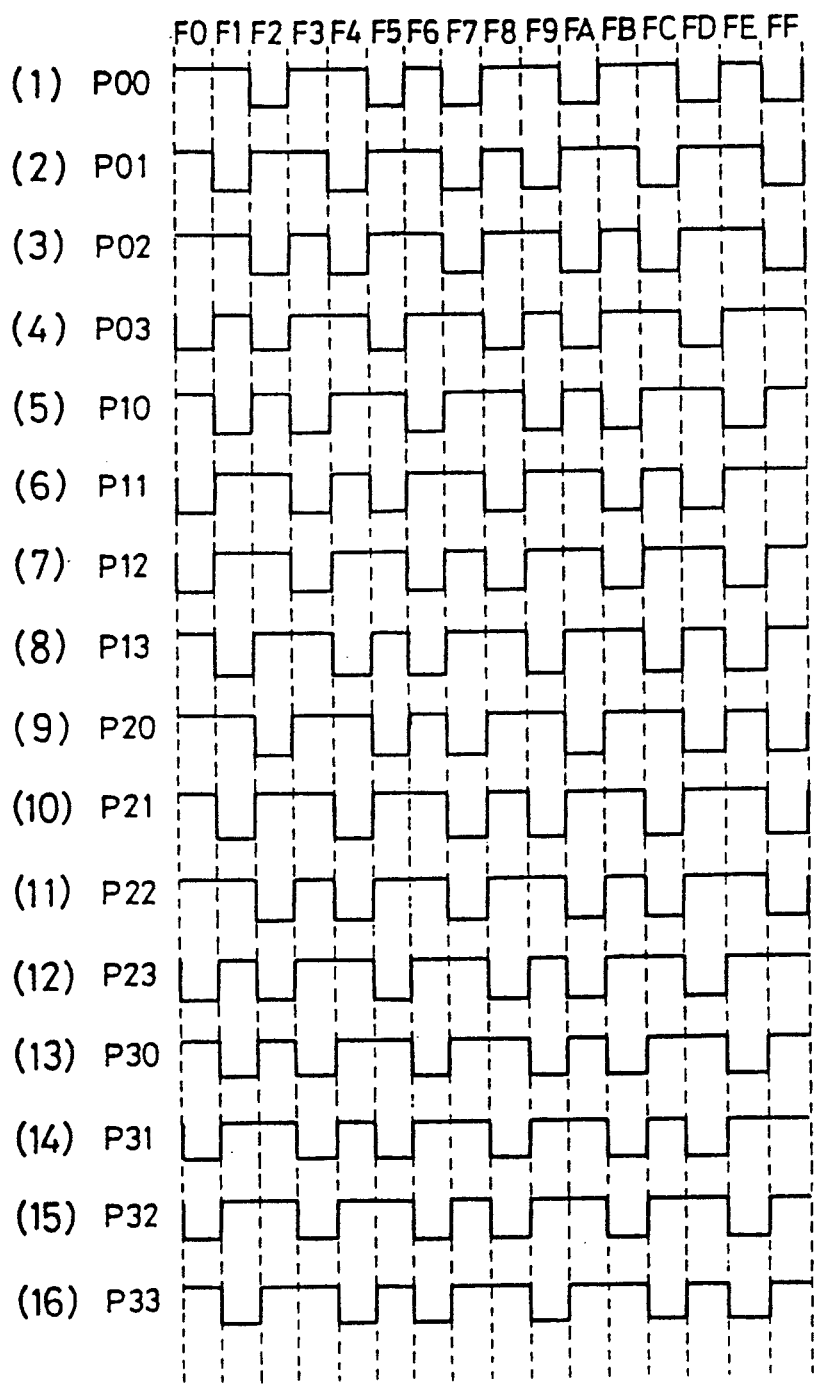
Figure 13:
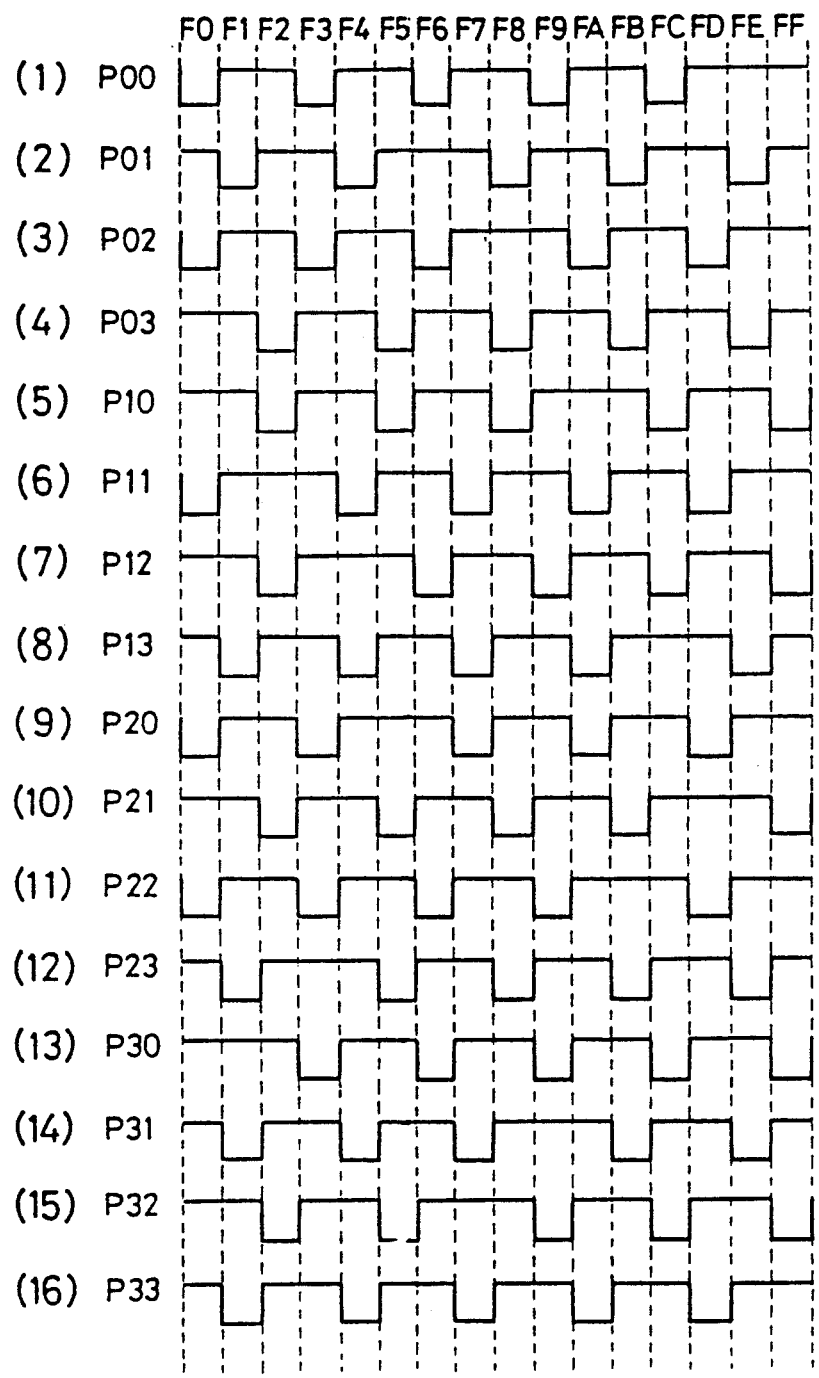
Figure 14:
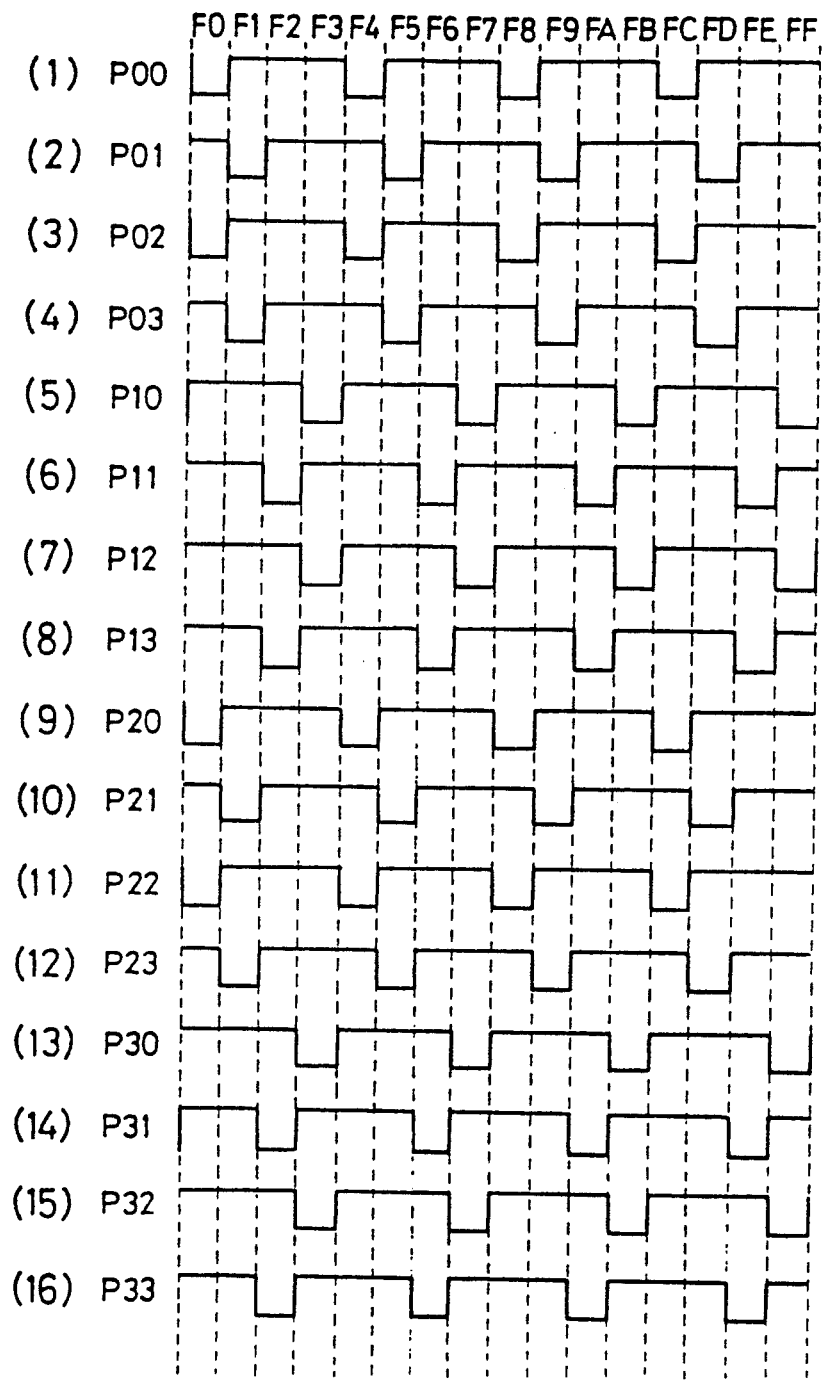
Figure 15:
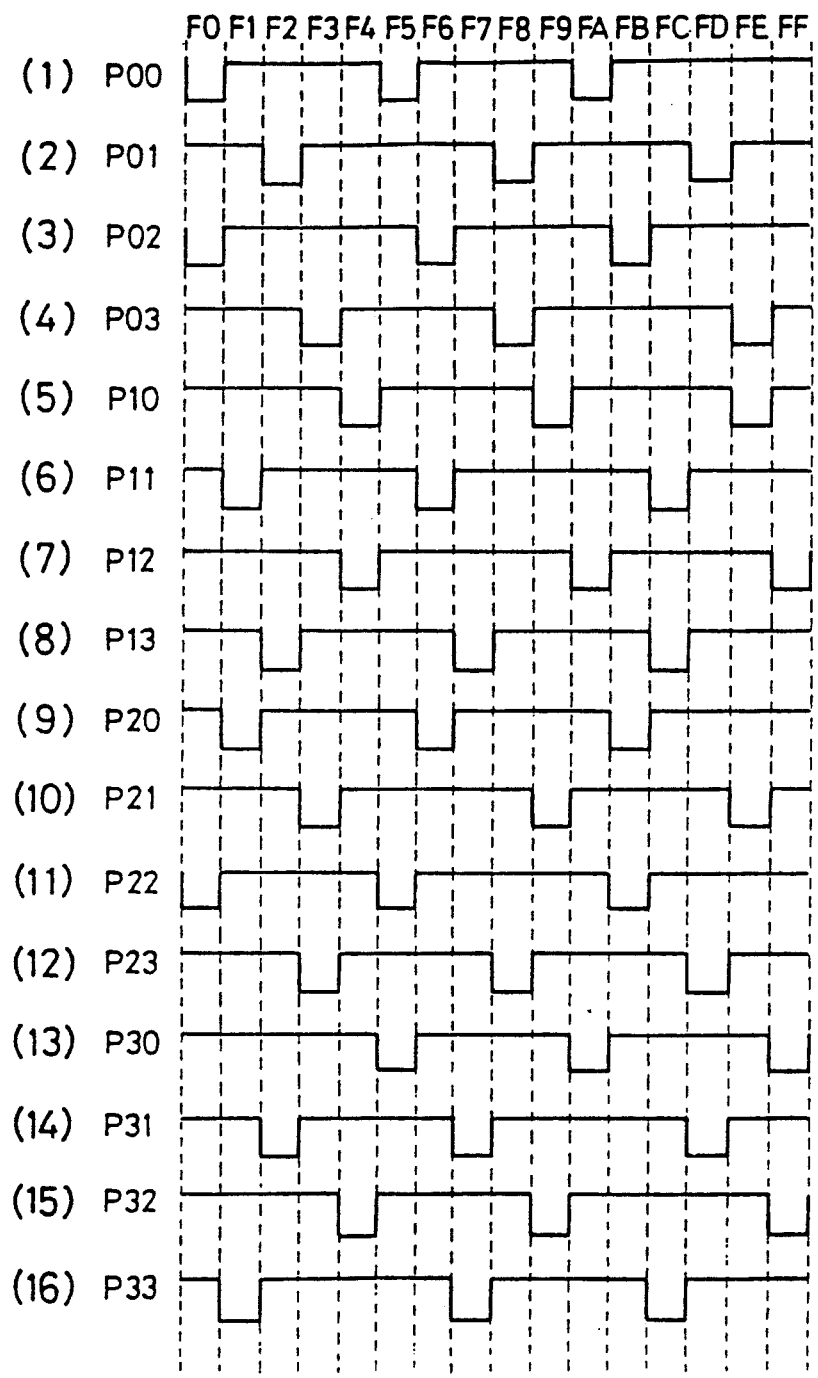
Figure 16:
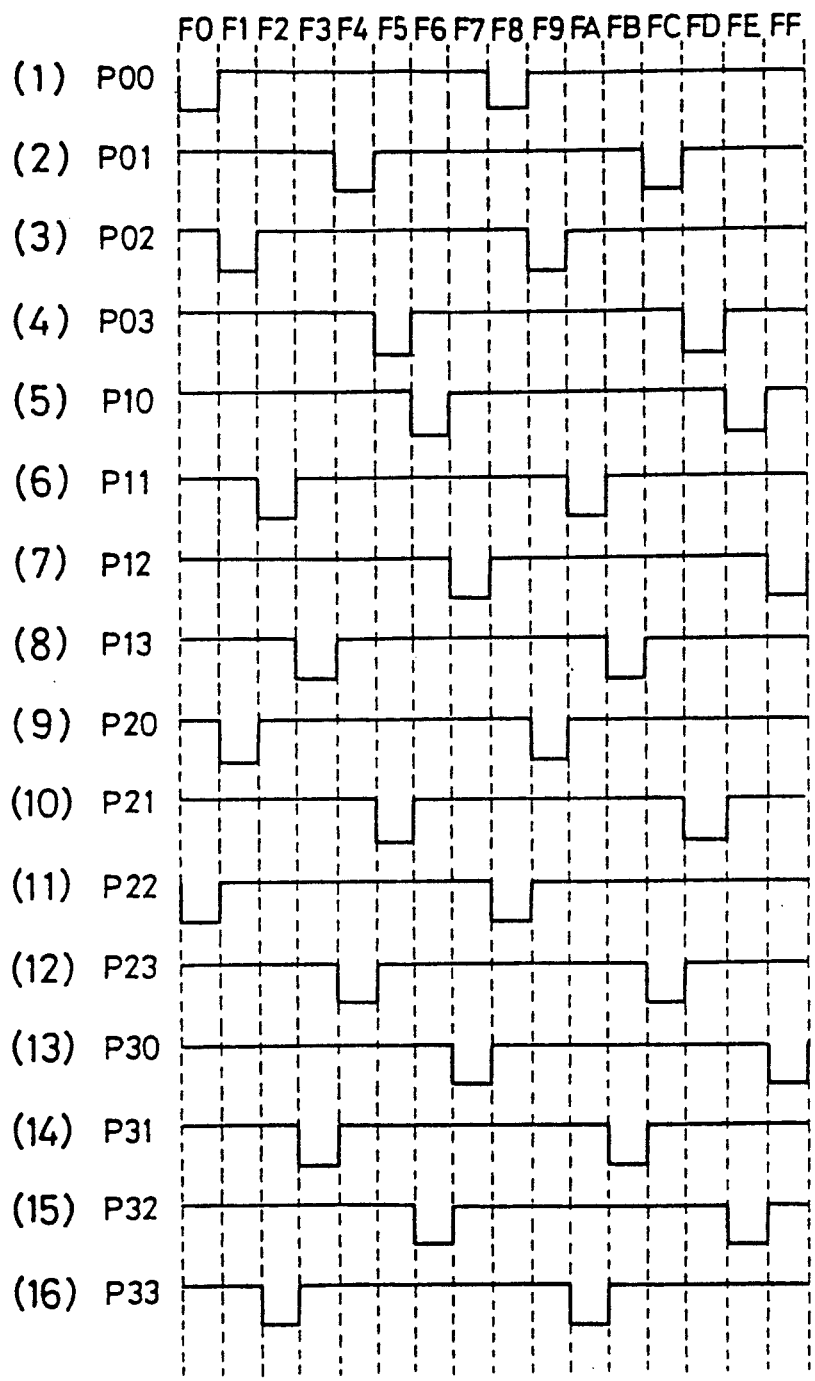
Figure 17:
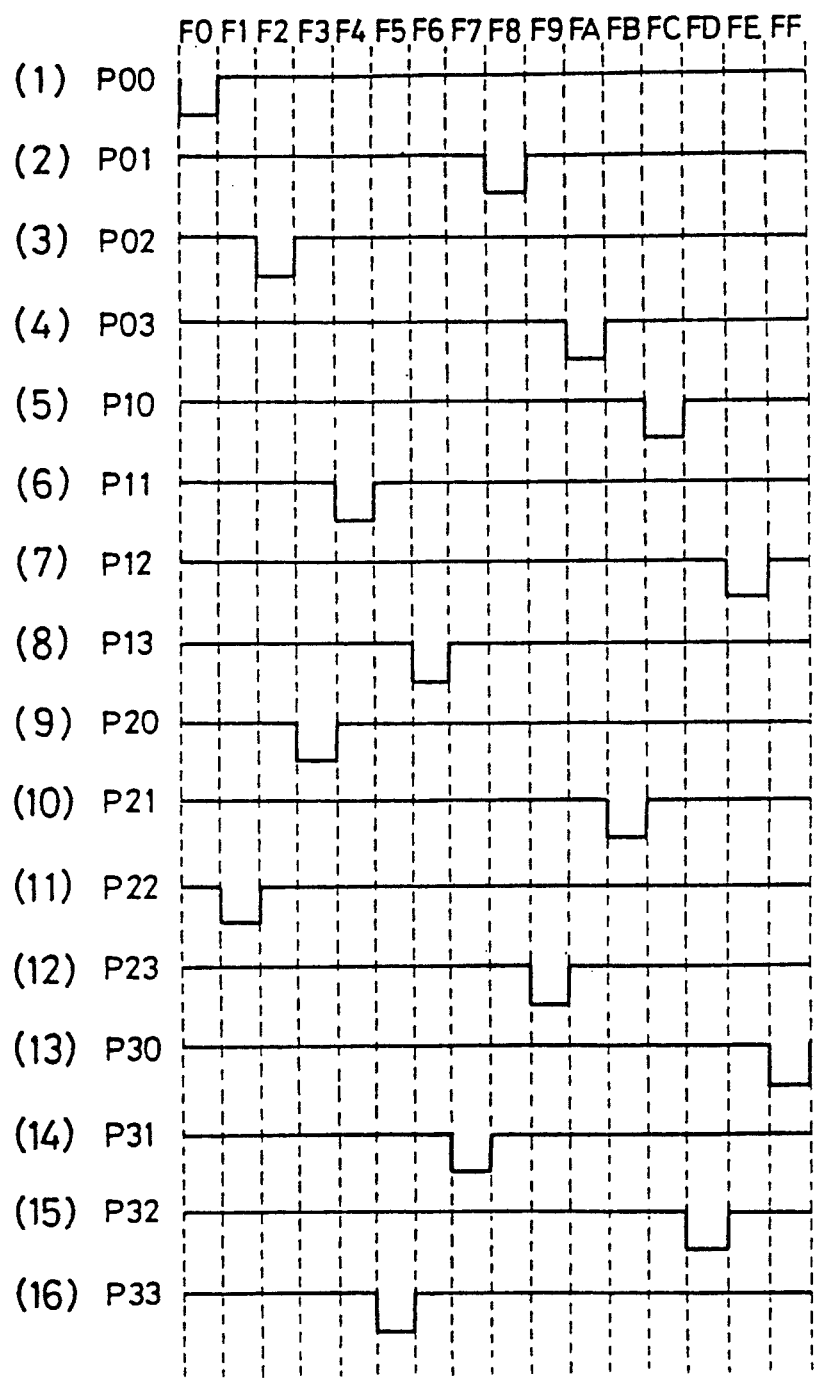

FIG. 5 is a representation showing display modes of picture element groups P00-P33 for gray scale K2 or duty 3/16. A display mode in which all picture elements included in a partition set on the screen of the dot matrix type display device 20 are displayed in the same gray scale will be explained in the following. An initial value in the shift register 14a is set such that, as may be clearly seen from Table 2, a high level signal is inputted to the terminals D0, D5, and D10. Accordingly, in the frame No. F0, a high level signal is outputted to the terminals Q0, Q5, and Q10. As Table 3 shows, values of signals outputted from the memory circuit 13a with respect to picture element groups P00, P22, and P02 are now 00h, 05h, and 0Ah. Then, signals for the terminals Q0, Q5, and Q10 are selectively outputted from the multiplexer 15a through the output terminal OUT. Accordingly, the condition of display in the frame No. F0 with respect to the partition set on the screen is as shown in FIG. 3 (1). In FIG. 3, "1" denotes lighting status and "0" denotes non-lighting status.

In the frame No. F1, initial values are shifted one time in the shift register 14a and accordingly a high level signal is outputted to the terminal Q15, Q4, and Q9. Thus, by reference to Table 3, as FIG. 3 (2)shows, a display status in which the picture element groups P20, P11, and P33 are lighted up.

In the frame No. F2, the output value from the shift register 14a is further shifted and thus a high level signal is outputted from the terminals Q14, Q3, and Q8. Referring again to FIG. 3, as (3) therein shows, the picture element groups P13, and P31, P01 are lighted up.

In the frame No. F3, the output value from the shift register 14a is further shifted and thus a high level signal is outputted from the terminals Q13, Q2, and Q7. From Table 3 it can be seen that signals for the terminals Q13, Q2, and Q7 are outputted from the output terminal OUT with respect to picture element groups P23, P03, and P21. This display condition is shown in FIG. 3 (4).

FIGS. 6 through 17 illustrate display modes of the picture element group P00-P33 in gray scales K3-K14.

In various partitions as defined above, the picture element groups P00-P33 put in the display in frame after frame are randomly selected, whereby the trouble of flicker on the screen can be effectively presented. Truely, by compositing the display conditions of the picture element groups P00-P33 in each gray scale as shown in FIGS. 4 to 17, it can be seen that luminance variation is completely equalized in individual partitions.

In the embodiment, as above described, even when a large area display has the same gray scale for each of the gray scales involved, uniform display being free of the trouble of flicker can be obtained. Further, a gray scale can be set for individual picture elements, and therefore, the method of the present invention involves no possibility of reduced resolution present in the prior art area gray scale method.

Figure 18:
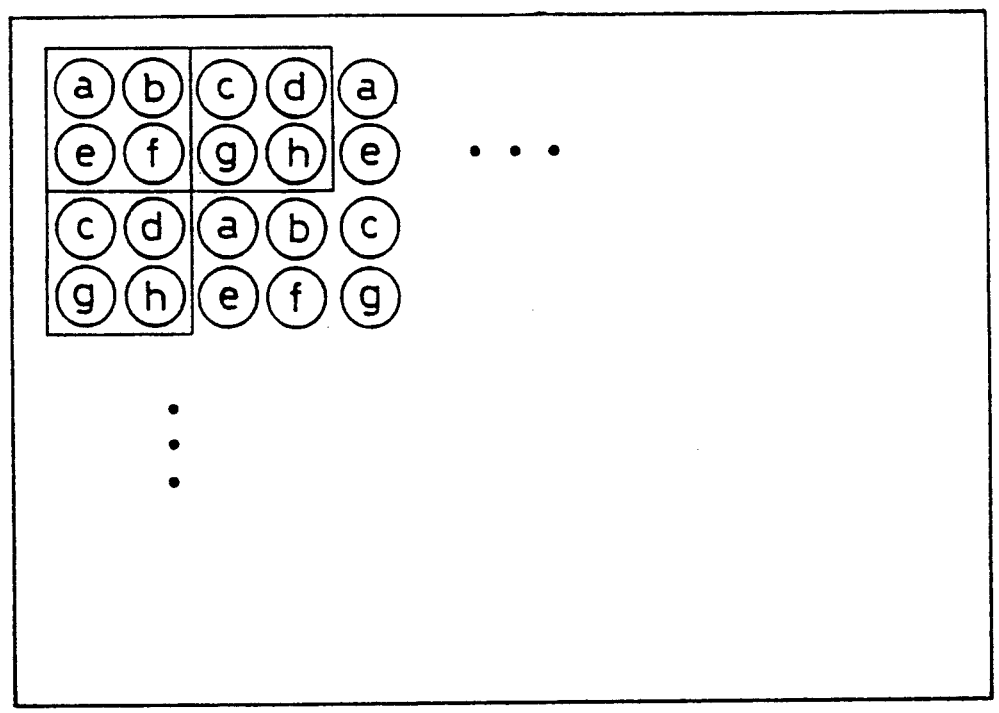
FIG. 18 is an explanatory view showing a screen on display in another embodiment of the present invention.
Figure 19:
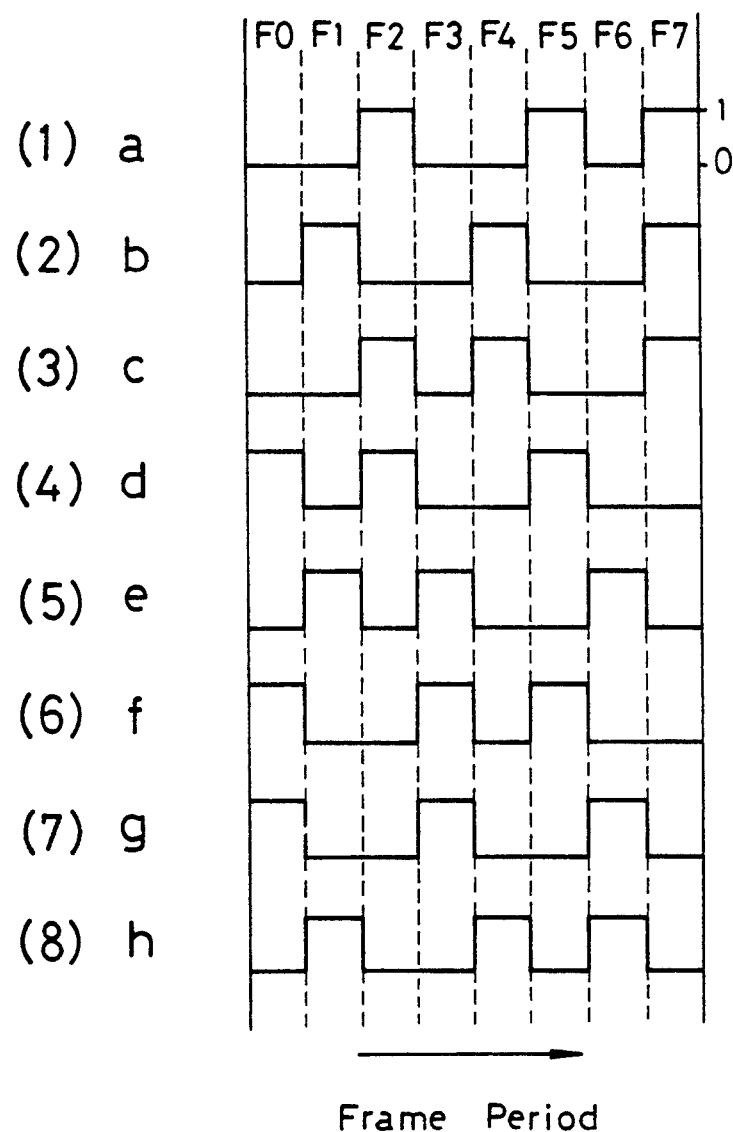
FIG. 19 is an explanatory view showing lighting modes of picture element a-h in another embodiment.
Figure 20:
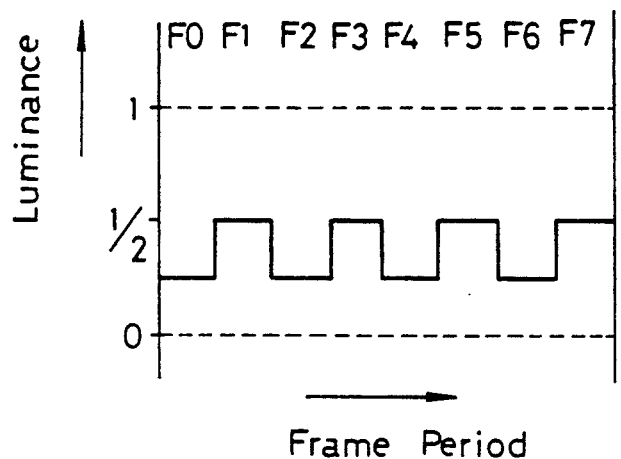
FIG. 20 is a composite representation of picture element groups a-d in lighting status.
Figure 21:
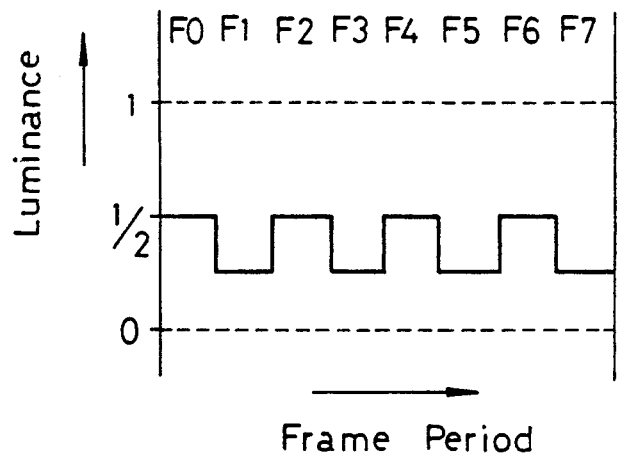
FIG. 21 is a composite representation of picture element groups e-h in lighting status.
Figure 22:
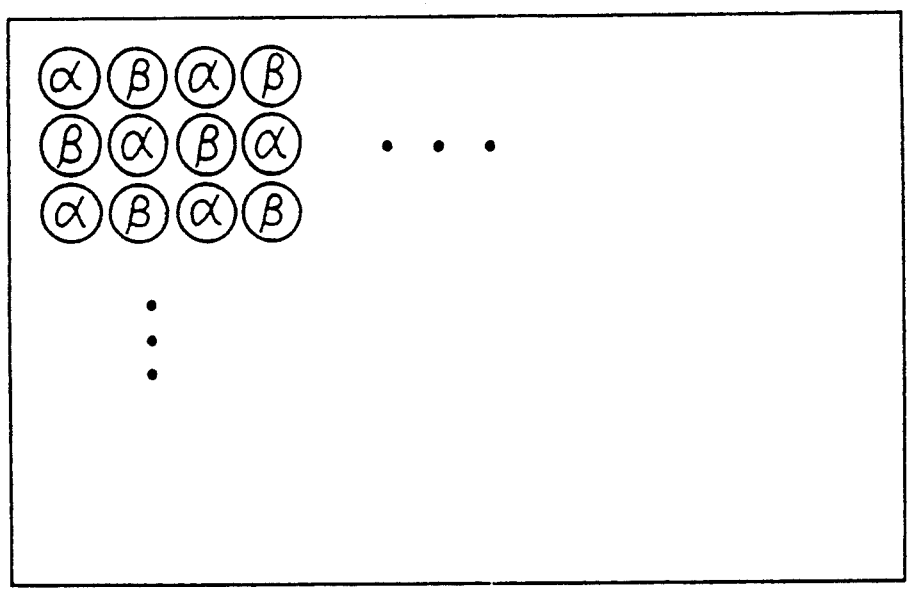
FIG. 22 is a view showing a screen on display in a prior art gray scale display system.
Figure 23:
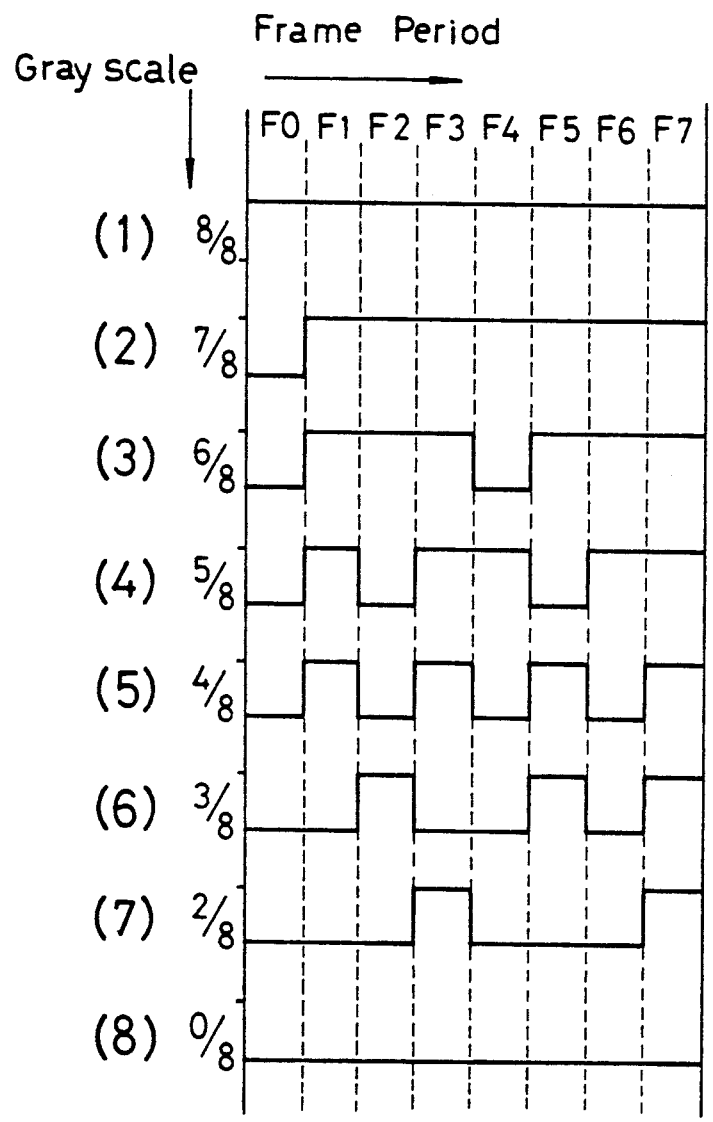
FIG. 23 is a view showing picture element $\alpha$ in lighting status in individual gray scales according to the prior art system.
Figure 24:
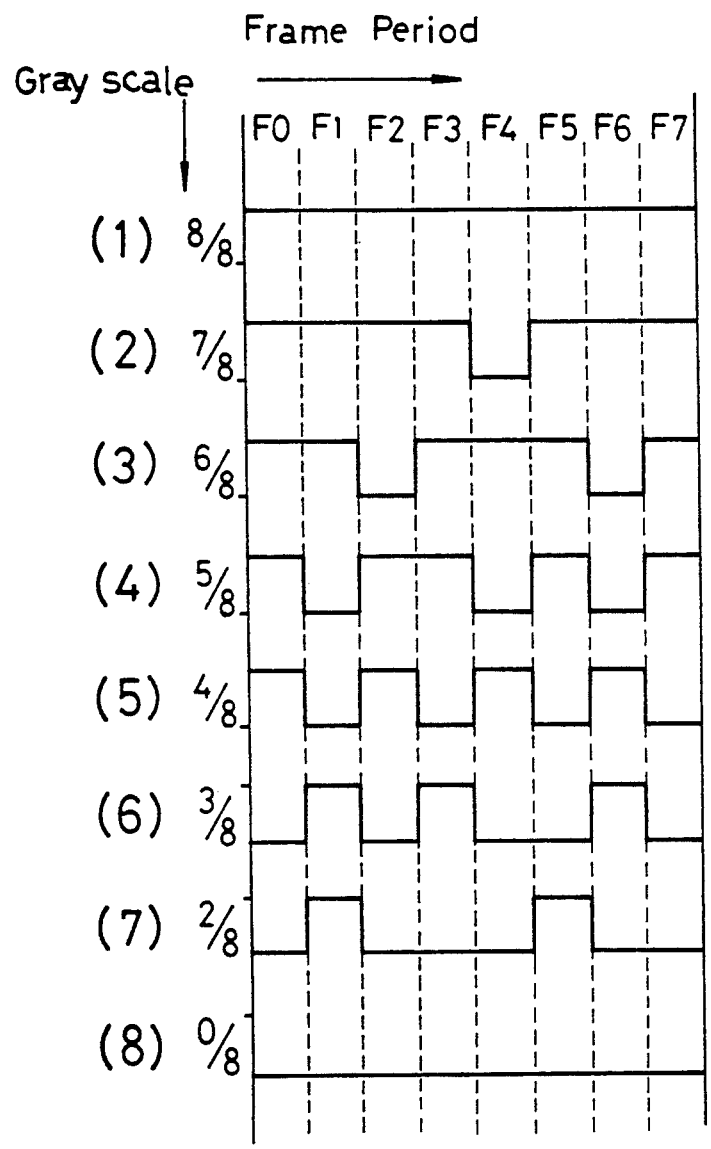
FIG. 24 is a view showing picture element $\beta$ in lighting status in individual gray scales according to the prior art system.
Figure 25:
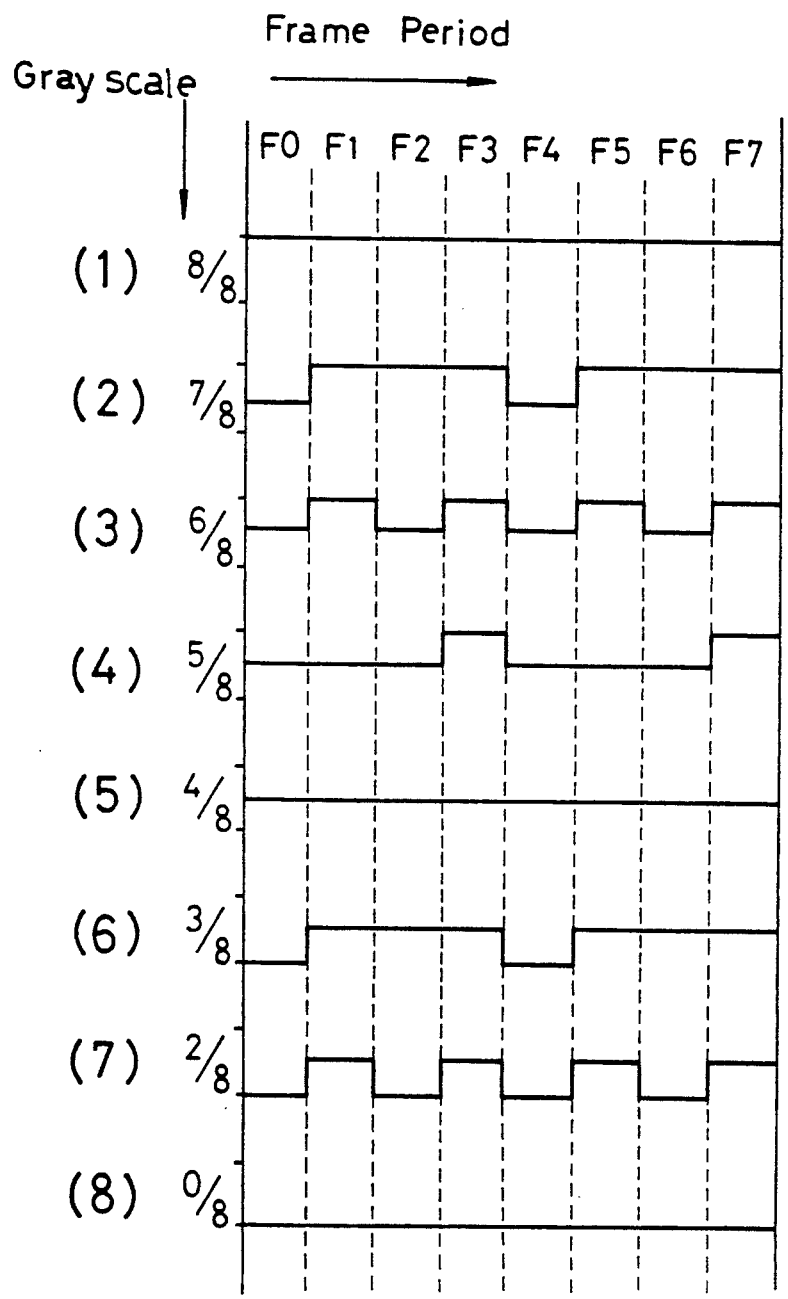
FIG. 25 is a representation showing luminance variations on the entire screen in the prior art system.

FIG. 18 is a view showing a screen on display in another embodiment of the present invention. In this embodiment, display has in 8 gray scales, for which purpose partitions of 8 picture elements are set. As FIG. 18 shows all picture elements are partitioned into picture element groups a-h, each partition having same constituent picture elements as each of the picture element groups a-h. FIG. 19 shows the mode of display with respect to gray scale of duty 3/8 in 8 frames or one period for picture element groups a-h. In FIG. 19, each high level represents lighting status, and each low level represents non-lighting status. In FIG. 19, (1) to (8) individually correspond to picture element groups a-h. FIG. 20 is a representation showing composite display status of picture element groups a–d. FIG. 21 is a representation showing composite display status of picture element groups e–h. As can be seen from FIGS. 20 and 21, the magnitude of luminance variation is 1/4 when the luminance is 1 in lighting status and 0 in non-lighting status. Such luminance variation occurs at a frequency of 35 Hz when the frequency of a vertical synchronizing signal is 70 Hz. In the prior art arrangement, as shown in (6) of FIG. 25, the magnitude of luminance variation is 1/2 and the frequency at which the variation occurs is 17.5 Hz, whereas according to the present invention, the magnitude of luminance variation is half that of the prior art and the frequency involved is two times. This fact clearly shows that the trouble of flicker is effectively overcome by the present invention. Furthermore, in a wider area than an area of four picture elements, the above mentioned luminance variation is completely eliminated as may be clearly seen if FIGS. 20 and 21 are composited together.

Therefore, as can be understood from the above description of the embodiment, it is now possible to carry out multitone display in a binary level display device, with no possible deterioration in resolution and being free from the trouble of flicker.

In the above described embodiments, 8-gray scale and 16-gray scale display modes are set forth, but of course other gray scale display may be employed. In the first embodiment, one partition consists of 4×4 picture elements; but alternatively, for example, 2×8 picture elements may be set as one group. Further, it is noted that initial values for display in frame No. F0 and values for phase lags are shown by way of example only; therefore, the present invention is not limited by those values.

In the embodiments described above, the present invention is applied to a display device in which one frame consists of one field. The present invention is equally applicable to display devices in which one frame consists of two fields.

The memory circuits 13a, 13b, 13c, and 13d may be of a logical circuit configuration, and the lighting signal generating circuit 11e may of same construction as the lighting signal generating circuit 11a.

What is claimed is:

1. A method for generating a gray scale display in a dot matrix type display device comprising the steps of:
    (a) dividing picture elements on a screen of the display device into a plurality of partitions, each partition having N number of picture elements and dividing each of said plurality of partitions into a plurality of picture element groups, each picture element group having at least N/4 number of picture elements, said picture elements corresponding to N degrees of the gray scale display in which a binary level signal is generated for each picture element to represent a lighting and non-lighting state;
    (b) setting each of the plurality of partitions to a desired degree of gray scale display, M;
    (c) generating a lighting pattern corresponding to the desired degree of gray scale display, M, for a plurality of frames, wherein the lighting pattern has M picture elements in the lighting state for each of the plurality of frames, wherein the lighting pattern varies for each picture element group for successive frames in the plurality of frames;
    (d) providing the lighting pattern to the plurality of partitions for the plurality of frames to produce the gray scale display;
    wherein the lighting pattern has an equal number of pixels in the lighting state for each of the plurality of pixel element groups over at most N/4 frames.

2. The method as claimed in claim 1 wherein each partition, when providing a 16-gray scale display, is comprised of 4 rows and 4 columns of picture elements.

3. The method as claimed in claim 1 wherein each partition, when providing an 8-gray scale display, is comprised of 2 rows and 4 columns of picture elements.

* * * * *